United States Patent [19]
Ballinger

[11] 4,160,464
[45] Jul. 10, 1979

[54] SEALING MEMBERS

[75] Inventor: Hugh A. Ballinger, Abingdon, England

[73] Assignee: United Kingdom Atomic Energy Authority, London, England

[21] Appl. No.: 529,726

[22] Filed: Dec. 5, 1974

[30] Foreign Application Priority Data

Dec. 6, 1973 [GB] United Kingdom ............... 56692/73

[51] Int. Cl.² ............................................. F16L 55/12
[52] U.S. Cl. ..................................... 138/93; 277/34.3
[58] Field of Search ................... 277/34.3, 34; 138/93, 138/90; 285/97; 251/4

[56] References Cited

U.S. PATENT DOCUMENTS

| 1,814,677 | 7/1931 | Fennema | 138/93 |
| 2,822,192 | 2/1958 | Beatty | 277/34.3 |
| 2,843,349 | 7/1958 | Meyer | 277/34 X |
| 3,121,570 | 2/1964 | Gilbert | 277/34.3 |
| 3,276,481 | 10/1966 | McNulty | 138/93 |
| 3,884,261 | 5/1975 | Clynch | 138/93 |
| 4,013,097 | 3/1977 | Calandra | 138/93 |

FOREIGN PATENT DOCUMENTS 626654  2/1936  Fed. Rep. of Germany ............. 285/97

Primary Examiner—Lenard A. Footland
Attorney, Agent, or Firm—Larson, Taylor and Hinds

[57] ABSTRACT

A sealing member for insertion into a bore of a pipe comprising a flexible inflatable toroidal bag which when inflated expands radially outward to contact the bore of the pipe and expands radially inwards to obturate the pipe.

7 Claims, 9 Drawing Figures

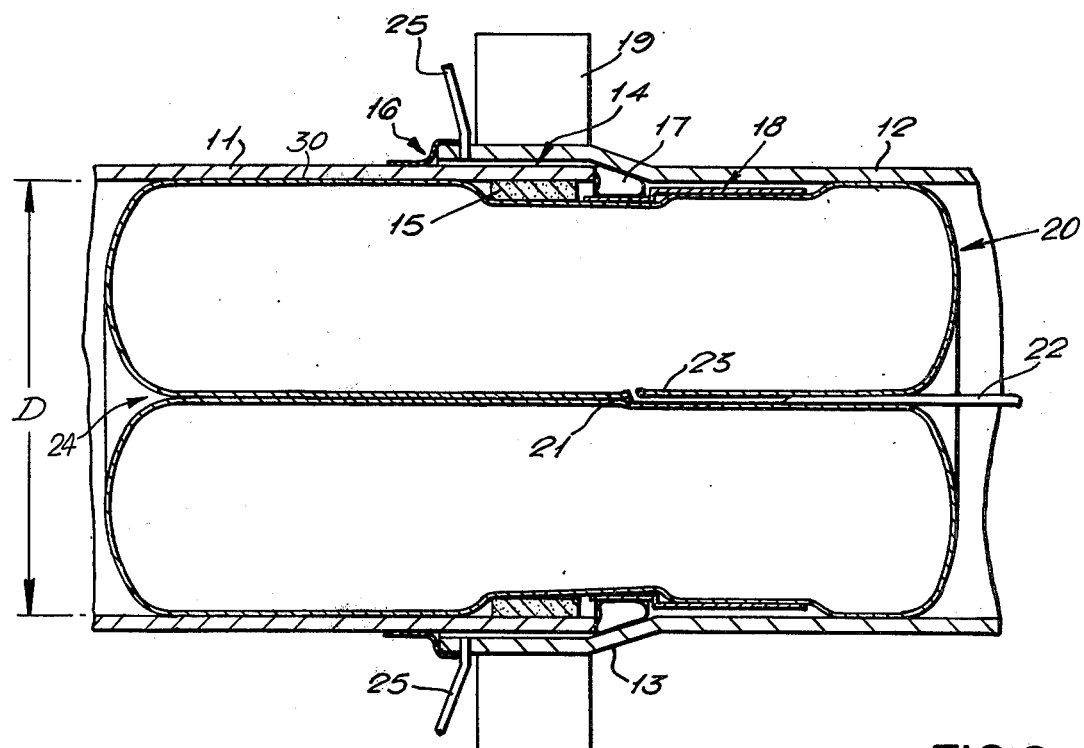

SEALING MEMBERS

This invention relates to sealing members which are suitable for use in the bore of a pipe and in particular although not exclusively to such sealing members for use in pipes to be joined under water by explosive joining techniques.

Broadly speaking, explosive joining techniques include joining together pipes by explosive welding or by forming an interference fit between components. In both these forms of explosive joining, either one pipe is joined to another pipe, or alternatively both pipes are joined to a common external collar which eventually forms part of the completed joint. Explosive welding involves forming a metallurgical bond between the components to be welded by detonating an explosive adjacent one of the components and causing it to impact with the other component to be welded. In forming an interference fit a metallurgical bond need not necessarily be formed, but basically a first component is provided with a recess, bore, or chamber, to receive a second component to be welded to it, and one component is then expanded or compressed to form an interference fit with the other component by detonating an explosive adjacent one of the components.

One problem that exists when, for example, welding together pipes under water is that if water is allowed to remain in the bores of the pipes in the vicinity of the explosive, when the explosive is detonated the shock wave transmitted through the water may cause irreparable damage to the pipes at regions away from the joint. It has been found that it is desirable to exclude water from the region of the explosion for a distance of as much as up to ten to twenty times the diameter of the pipe. One way of achieving this is to provide some form of sealing means which displaces the water in the pipes and forms an effective seal to prevent the ingression of water into the region where the explosion will occur.

An object of the present invention is to provide a sealing member which may find application in explosive joining techniques employed to join pipes in liquid environments.

According to the present invention there is provided a sealing member for insertion into a bore of a pipe comprising a flexible inflatable toroidal bag which when inflated expands radially outward to contact the bore of the pipe and expands radially inwards to obturate the pipe.

Preferably the toroidal bag extends in a direction along the length of the pipe.

Preferably the toroidal bag is formed by re-entrantly folding a length of flexible tubing and joining the ends of the tube to form an elongated toroid, the outer diameter of which corresponds to the outer diameter of the pipe.

The toroidal bag may be made of an elastic or plastic material.

Preferably the inflation point of the toroidal bag is in the inner wall of the toroid. This inflation point may be located at a central region of the inner wall.

Sealing members constructed in accordance with the present invention may be used to displace liquids or gases from the bore of a pipe or to reduce the ingression or egression of liquids into or out of the bore of a pipe.

The present invention will now be described by way of an example only and with reference to the accompanying drawing in which FIG. 1 shows two pipes to be joined together by explosive welding prior to detonation of the explosive.

FIGS. 2a, 2b and 2c show stages in the construction of the sealing member of FIG. 1 wherein FIG. 2a is a perspective view of a tube to be formed into a sealing member, FIG. 2b is a perspective view of the partially formed tube taken through a longitudinal central axis of the tube and FIG. 2c is a view similar to FIG. 2b wherein the lower region of the sealing member has been folded upwardly against the upper region thereof.

FIGS. 3a to 3e shows various stages of inflation of the sealing member of FIG. 1.

Referring to the drawing, there is shown two metal pipes 11 and 12 which are to be joined together. For illustrative purposes, said pipe has an internal diameter D as shown in FIG. 1. The end of pipe 11 is not deformed prior to welding whereas the end 13 of pipe 12 is belled outwardly so as to provide a larger diameter region to accommodate the end of pipe 11, the pipes 11 and 12 are assembled relative to each other so as to provide a radially extending annular gap 14 between the end of pipe 11 and the end of pipe 12. An annular explosive 15 is placed in the bore of pipe 11 prior to assembly and held there by temporary constraining means (not shown). A flexible rubber sleeve 16 is slid along pipe 11 and is pulled over the end of pipe 12 to seal off the outer extremity of the radial gap 14, whilst an inflatable bag 17 is provided in the recessed region of the end of pipe 12 so that when inflated it seals the innermost extremity of the annular gap 14. To assist in the location of the inflatable bag 17 in the recessed portion of the end of pipe 12, the inflatable bag 17 is mounted loosely on a guide member 18, which may be made of marine plywood or a plastic blow moulding.

A segmented anvil 19 constructed in accordance with my copending U.S. application Ser. No. 382,299, now U.S. Pat. No. 3,893,222 is assembled externally of the end of pipe 12. The anvil 19 functions in the manner described in the above mentioned United States Patent.

A sealing member 20 constructed in accordance with the present invention is inserted into the bores of pipes 11 and 12 while folded flat as shown in FIGS. 2c and 3a and inflated to the shape shown in FIGS. 1 and 3e. As shown in FIGS. 2a and 2b, the sealing member 20 is made by taking a length of polythene tubing t (FIG. 2a) about 1 mm thick, the outer diameter of which conforms to the inside diameter D of the pipes 11 and 12, and folding the ends, x and y re-entrantly down the bore of the polythene tubing in the direction as shown by the arrows in FIG. 2a and joining them to form a joint 21 as shown in FIG. 2b in the originally formed state (and also in FIG. 1 when the member 20 is in its expanded state), whereby the tube t is formed into a toroid sealing member 20 with inwardly facing walls 23 surrounding a central hole 24 extending along the axis of the toroid and an outer wall 30. An air pipe 22 is provided (FIG. 1) to supply air into the toroid through an opening formed in the inner wall 23 of the sealing member 20, at a central region thereof.

To position the sealing member 20 in the bore of pipes 11 and 12 when they are filled with water for example, the sealing member is folded as shown in FIGS. 2c and 3a. As is evident in FIG. 3a the sealing member tends to float to the top of the cross-section of the pipes 11 and 12. On inflation air of course first goes to the upper region of the bag, displacing water as inner wall 23 and the lower region of the bag expand downwardly as shown in FIGS. 3b and 3c. The bag then proceeds to displace further water as the lower region of the sealing member becomes inflated as shown in FIG. 3d. Finally, any water trapped in the central void 24 is finally expelled by further inflation of the sealing member 20. It will be seen from FIGS. 3a to 3e that inflation of the sealing member 20 causes it to first expand radially outward to contact the bore of pipes 11 and 12 and thereafter to expand radially inwardly to obturate the pipes 11 and 12 as shown in FIGS. 1 and 3e.

In operation, in order to explosively weld the pipes 11 and 12 together under water the sealing member 20 is positioned in the vicinity of the explosive 15 and inflated as described above such that it bridges the joint. If necessary, the sealing member 20 may be rolled axially along the pipes 11 and 12 to the correct position once inflated. The radial gap 14 is then washed and dried and subsequently filled with air at a pressure slightly below the hydrostatic pressure head at the depth at which the pipes are to be welded. In order to wash and dry the annular gap 14 the rubber sleeve 16 is first positioned to seal off the outer extremity of the gap 14 and then the inflatable annular seal 17 is inflated to seal off the inner region. This having been done, any water in gap 14 is first pumped out through pipes 25 and the gap 14 is flushed by pumping in fresh clean water and pumping out the same. The space is then dried by pumping in methylated spirits and pumping out the same. Finally air is admitted to the radial gap 14 at a pressure of about 2 lbs per square inch below the hydrostatic pressure head in the region at which the pipes are being welded. This may be conveniently achieved by connecting pipes 25 to an air pressure source located a few feet above the pipes.

With the seals 16 and 17 and sealing member 20 in position and the radial gap 14 filled with air the anvil 19 is positioned externally to resist the forces of the explosion. The explosive is then detonated and the end of pipe 11 is caused to accelerate across the radial gap 14 and impact with the end of pipe 12 to form a weld. The anvil 19 is made of segments which are held in position by temporary constraining means (not shown) and the segments are free to accelerate away from the interface between the anvil 19 and the end of pipe 12 by the stored strain energy in the anvil produced by the explosion as is explained in the above mentioned U.S. patent.

Whilst the sealing member 20 as described above is made of polythene it is to be understood that it may be made of any flexible material which is suitable for making an inflatable bag, examples of other materials are elastic materials such as rubber, neoprene, and other plastics materials.

It has been found that sealing members constructed in accordance with the present invention may be usefully employed for obturating a section of a pipe which is conveying a fluid, to enable the pipe to be cut, for example to insert a fresh section of pipe or to replace or repair a section of the pipe, without the need to spill the contents of the pipe or to evacuate the whole length of pipe.

One way of doing this is to cut one or more small diameter holes in the wall of the pipe using a working chamber or pot which is sealed to the outside of the pipe to prevent the contents of the pipe escaping from the pipe through the hole. A sealing member which is folded in such a way that on inflation it first unfurls lenthwise along the pipe and then unfurls to obturate the pipe and may then be inserted into the hole. In this instance it may be preferable to inflate the sealing member through the external wall of the sealing member rather than through an inner wall. The inflating tube may be cut-off and sealed once the sealing member is inflated. Preferably some means are provided to enable the sealing member to be deflated later and retrieved through the hole made in the pipe. The sealing member may be moved by transferring the fluid within the pipe from one side of the sealing member to the other by using an external by-pass line tapped into the pipe to be cut each side of the sealing member, for example, to position the sealing member up-stream or down-stream of the hole in the pipe to be cut. A second sealing member may then be inserted through the hole and positioned within the pipe. With the two sealing members in position the contents of the pipe in the space between them may be cleared and the pipe cut.

The pipe may be rejoined using any suitable technique, and once the pipe is rejoined the sealing members may be removed through the hole in the pipe through which it was inserted and the holes resealed for example by welding or bolting a patch to the pipe.

I claim:

1. A method for explosively welding pipes together under water, including the steps of inserting into the bore formed by the pipes to be welded, when filled with water, a sealing member in the form of a flexible, inflatable toroidal bag having a central hole along the axis thereof, said bag, upon insertion being in a deflated generally flat condition which floats in the water in the pipe, inflating the toroidal bag to expand it radially outwards across the bore into sealing engagement with the bore of the pipes around its entire outer circumference and radially inwards to bring the inwardly facing walls of the torus together to close off the said central hole of the torus to thereby obturate the pipes concurrently completely displacing water from the bore of the pipes for a distance sufficiently great to extend on each side of the region where the pipes are to be welded and assuring that the expanded bag is located adjacent the joint to be welded, extending axially on each side thereof.

2. In combination, a pair of tubular pipes having overlapping ends arranged to be welded together, and a sealing member insertable into the bore formed by the pipes such that the sealing member bridges the said joint, the sealing member comprising a flexible inflatable toroidal bag having a central hole along the axis thereof, the outer diameter of the toroidal bag being dimensioned to sealingly engage the bore of the pipe in the inflated condition, means for expanding the bag radially outwardly to said inflated condition to sealingly engage against the bore when the toroidal bag is inflated with the axis of the torus parallel to the axis of the pipes, and the toroidal bag being further dimensioned to close off the said central hole of the torus to obturate the pipes, said bag being of a generally uniform wall thickness and sufficiently thin that the bag is capable of being folded to be generally flat in its collapsed condition and of being rolled axially along the bore in its inflated condition, said bag when mounted in the bore being independent of the pipe structure forming the bore, such that the bag, in its inflated condition, can be rolled axially to different locations along the bore.

3. The combination according to claim 2 wherein the toroidal bag is a single piece of material, the ends of which are connected along a seam running circumferentially along the inwardly facing wall of the toroid.

4. The combination according to claim 2 wherein the toroidal bag is made of a fluid impermeable elastic material.

5. The combination according to claim 2 wherein the toroidal bag is made of a fluid impermeable plastic material.

6. The combination according to claim 2 wherein the inflation point of the toroidal bag is in the inwardly facing wall of the toroid.

7. The combination according to claim 2, the material of the bag being sufficiently flexible such that the bag, as inserted in the pipe in the uninflated state, can be folded in a direction transverse to the axis of the pipe into an essentially flat state.

* * * * *